United States Patent
Lesko et al.

(10) Patent No.: US 9,322,246 B2
(45) Date of Patent: Apr. 26, 2016

(54) SOLIDS DELIVERY APPARATUS AND METHOD FOR A WELL

(71) Applicant: Schlumberger Technology Corporation, Sugar Land, TX (US)

(72) Inventors: Timothy Lesko, Conway, AR (US); Kim Hodgson, Sugar Land, TX (US); Edward Kent Leugemors, Sugar Land, TX (US); Rod Shampine, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 14/032,772

(22) Filed: Sep. 20, 2013

(65) Prior Publication Data

US 2015/0083426 A1 Mar. 26, 2015

(51) Int. Cl.
| | |
|---|---|
| *E21B 27/00* | (2006.01) |
| *E21B 41/00* | (2006.01) |
| *B60P 1/00* | (2006.01) |
| *E21B 17/00* | (2006.01) |
| *E21B 43/267* | (2006.01) |
| *E21B 43/26* | (2006.01) |

(52) U.S. Cl.
CPC . *E21B 41/00* (2013.01); *B60P 1/00* (2013.01); *E21B 17/00* (2013.01); *E21B 27/00* (2013.01); *E21B 43/26* (2013.01); *E21B 43/267* (2013.01)

(58) Field of Classification Search
CPC ...... E21B 43/26; E21B 43/267; E21B 134/14
USPC .............. 166/308.1, 90.1, 279, 250.14
See application file for complete search history.

(56) References Cited

U.S. PATENT DOCUMENTS

| | | | |
|---|---|---|---|
| 4,411,390 A | 10/1983 | Woten | |
| 2003/0019627 A1 | 1/2003 | Qu et al. | |
| 2007/0144739 A1 | 6/2007 | Fitzgerald | |
| 2008/0179092 A1* | 7/2008 | Fragachan | ...................... 175/24 |
| 2008/0196942 A1 | 8/2008 | Bingham et al. | |
| 2008/0245527 A1* | 10/2008 | Leugemors et al. | ........ 166/280.1 |
| 2010/0243242 A1* | 9/2010 | Boney et al. | .............. 166/250.01 |
| 2010/0243251 A1 | 9/2010 | Luharuka et al. | |
| 2011/0024129 A1 | 2/2011 | Turakhia et al. | |
| 2011/0240293 A1* | 10/2011 | Lesko et al. | ................ 166/280.1 |
| 2014/0044508 A1* | 2/2014 | Luharuka et al. | .............. 414/293 |

* cited by examiner

*Primary Examiner* — Doug Hutton, Jr.
*Assistant Examiner* — Silvana Runyan
(74) *Attorney, Agent, or Firm* — Mathiew Vandermolen; Rachel E. Greene; Michael L. Flynn

(57) ABSTRACT

A method that is usable with a well includes introducing solids into a pneumatic stream to produce a solids-containing pneumatic stream; communicating the solids-containing pneumatic stream to a blender assembly to mix the solids with at least one other material to produce a flow; and pumping the flow into the well.

23 Claims, 5 Drawing Sheets

SOLIDS DELIVERY APPARATUS AND METHOD FOR A WELL

BACKGROUND

Solids, such as fibers, may be introduced into a flow that is pumped into a well for a number of different reasons. For example, fibers may be mixed with a proppant and a carrier fluid in a hydraulic fracturing operation for purposes of preventing settling of the proppant. Moreover, the fibers may create a more uniform distribution of the proppant over the fractures.

Fibers may be used in other oilfield applications, such as applications in which the fibers are mixed with cement. For example, in a well cementing operation, the fibers may contribute to the strength of the cement and enhance the rigidity and stress tolerance of the cement.

Fibers may also be combined with a gelling agent with or without other solids for purposes of fluid diversion. In this regard, a combined fiber and gelling agent mixture may be used to treat selected regions of a well to prevent/control fluid loss in the regions.

Fibers may be used in other oilfield applications, such as applications in which the fibers are selectively mixed with a carrier fluid and proppant to create different proppant-bearing zones in a well. In this regard, the fibers may be used to establish one or more segregated regions of the well, so that some regions contain proppant, whereas other regions do not.

SUMMARY

The summary is provided to introduce a selection of concepts that are further described below in the detailed description. This summary is not intended to identify key or essential features of the claimed subject matter, nor is it intended to be used as an aid in limiting the scope of the claimed subject matter.

In an example implementation, a method that is usable with a well includes introducing solids into a pneumatic stream to produce a solids-containing pneumatic stream; communicating the solids-containing pneumatic stream to a blender assembly to mix the fibers with at least one other material to produce a flow; and pumping the flow into the well.

In another example implementation, a system that is usable with a well includes a blower assembly, a blender assembly and a conduit. The blower assembly receives fibers and generates a pneumatic stream comprising the fibers. The blender assembly mixes the fibers with at least one additional material to generate a flow to be communicated into the well. The conduit communicates the pneumatic stream to the blender assembly.

In yet another example implementation, a method that is usable with a well includes, in blending equipment, mixing fibers into a mixture to be communicated downhole in the well. The blending equipment includes a hopper to receive the fibers and a second hopper to receive another material of the mixture. The method includes in pneumatic blowing equipment that is spatially separated from the blending equipment, introducing the fibers into a hopper of the pneumatic blowing equipment to produce a forced stream of the fibers. The method further includes routing the forced stream of fibers from the blowing equipment to the blending equipment using a conduit that has a length of at least ten feet; and positioning an end of the conduit to deliver the forced stream into the hopper of the blending equipment.

Advantages and other features will become apparent from the following drawings, description and claims.

DETAILED DESCRIPTION

In the following description, numerous details are set forth to provide an understanding of features of various embodiments. However, it will be understood by those skilled in the art that the subject matter that is set forth in the claims may be practiced without these details and that numerous variations or modifications from the described embodiments are possible.

As used herein, terms, such as "up" and "down"; "upper" and "lower"; "upwardly" and downwardly"; "upstream" and "downstream"; "above" and "below"; and other like terms indicating relative positions above or below a given point or element are used in this description to more clearly describe some embodiments. However, when applied to equipment and methods for use in environments that are deviated or horizontal, such terms may refer to a left to right, right to left, or other relationship as appropriate.

In general, systems and techniques are disclosed herein for purposes of delivering solids to a blender assembly, an assembly that combines, or mixes, the solids with at least one other material (a liquid and/or further solids, as examples) to produce a mixture that is introduced into a well. Moreover, techniques and systems are disclosed herein for purposes of metering the rate at which the fibers are delivered to the blender assembly.

As used herein, the term "solids" or "solid" encompasses proppant, particulate material, a precursor material, a hydratable material, and the like. It may comprise a material, such as fibers, flocs, flakes, discs, rods, stars, etc.; all terms may be used indifferently. In embodiments, the material may be fibers. As examples, the fibers may comprise polylactic acid (PLA); polyglycolic acid (PGA); polyethylene terephthalate (PET); polyester, polyamide, polycaprolactam and polylactone; poly(butylene) succinate; polydioxanone; glass; ceramics; carbon (including carbon-based compounds); elements in metallic form; metal alloys; basalt; acrylic; polyethylene; polypropylene; novoloid resin; polyphenylene sulfide; polyvinyl chloride; polyvinylidene chloride; polyurethane; polyvinyl alcohol; polybenzimidazole, polyhydroquinone-diimidazopyridine; poly(p-phenylene-2,6-benzobisoxazole);

rayon, cotton, wool, linen, hemp (or other "natural fiber" materials); rubber; sticky fiber; or a combination thereof.

Figure 1:
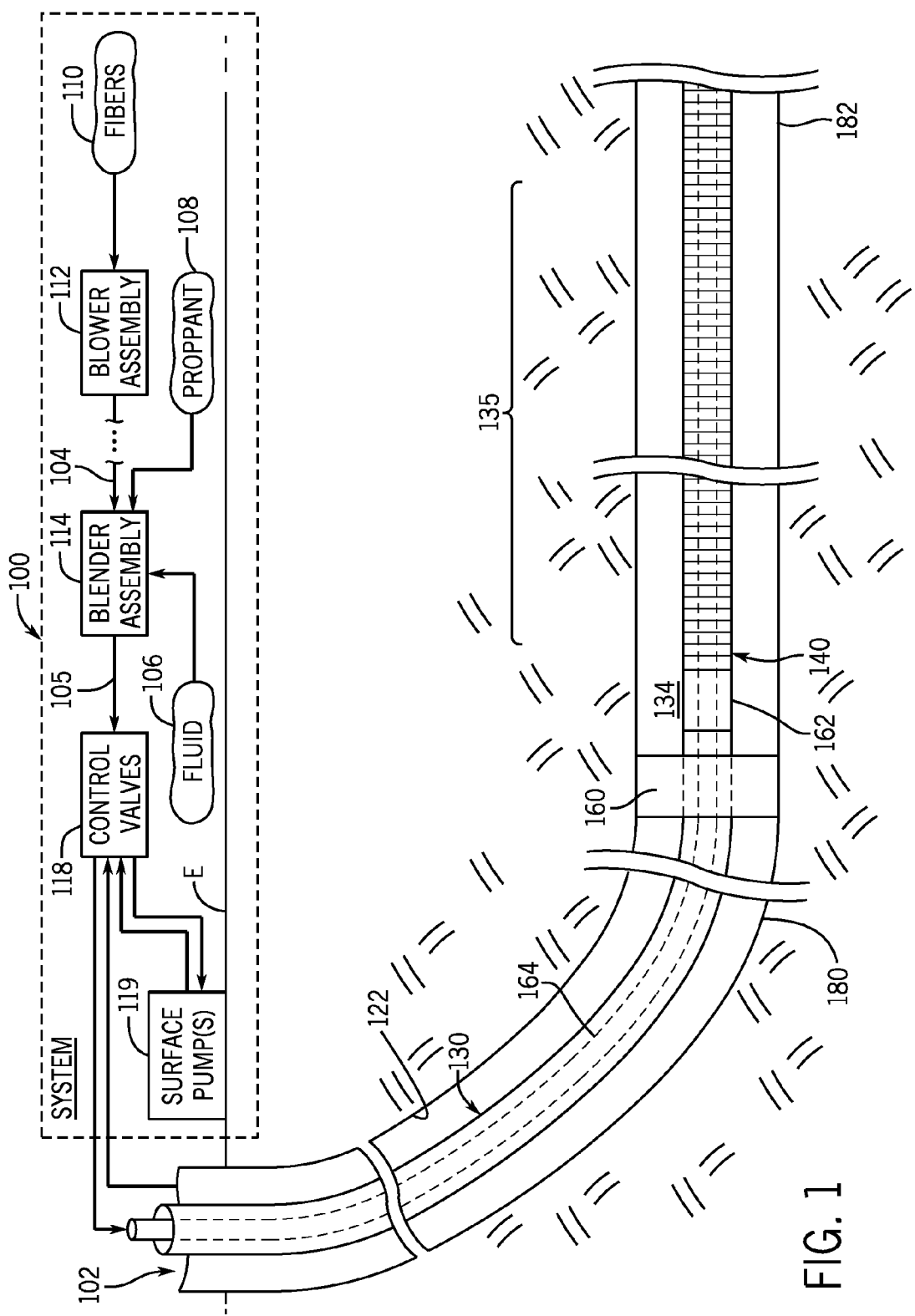
FIG. 1 is a schematic diagram of a well and an associated system for delivering a flow containing solids to the well according to an example implementation.

Referring to FIG. 1, as a more specific example, in accordance with example implementations that are disclosed herein, the solids may be fibers. For these implementations, a blender assembly 114 may, through mixing, produce a flow that contains fibers and which is delivered to a well 102. It is noted that although specific wells and uses of fibers in the wells are discussed herein, a fiber-based material may be used for a myriad of different oilfield applications and be used in many types of wells other than the ones that are described herein. All such wells, fiber uses and other fiber deliver/metering systems, including those not specifically described herein, are within the scope of the appended claims.

For the example implementation that is depicted in FIG. 1, the well 102 includes a wellbore 122, which may traverse one or more hydrocarbon-bearing formations. As depicted in FIG. 1, the wellbore 122 may be a lateral wellbore that generally extends from a heel end 180 to a toe end 182 through one or more zones, or stages of the well 102. The well 102 may include other vertically and/or laterally extending wellbores, as can be appreciated by the skilled artisan.

For the example of FIG. 1, the wellbore 122 extends into a particular stage, or zone 135 in which fibers may be delivered. A tubing string 130 for this example extends downhole into the wellbore 122 and contains a screen assembly 140, which is positioned inside the zone 135. For this example "open hole" completion, the tubing string 130 may contain at least one packer 160, which is set (radially expanded) to form a corresponding annular seal between the exterior of the tubing string 130 and wellbore wall. The tubing string 130 may contain other such packers 160 for purposes of establishing other isolated stages of the well 102.

It is noted that the packer 160 may contain dogs, or slips, that, when the packer 160 is set, radially extend to anchor the packer (and tubing string 130) to the wellbore wall, in accordance with example implementations. As examples, the packer 160 may be one of numerous types of packers, such as a weight-set packer, a hydraulically-set packer, a mechanically-set packer, an inflatable packer, a swellable packer, and so forth, as can be appreciated by the skilled artisan.

The screen assembly 140 contains one or more screens (wire mesh screens, wire-wrapped screens, and so forth), which serve as a filter media layer having openings that are sized to isolate a central passageway of the tubing string 130 from a soon-to-be deposited composite proppant and fiber-based material. In this manner, the proppant and fiber-based material, which may be deposited in an annulus 134 about the tubing string 130 in connection with a hydraulic fracturing operation. In general, the hydraulic fracturing operation pressurizes the surrounding formation(s) to form corresponding fractures and introduce proppant for purposes of sustaining communication through the fractures when the hydraulic pressure is released.

It is noted that FIG. 1 depicts the well 102 in a state after installation of the tubing string 130 but before the hydraulic fracturing operation is performed. It is noted that many variations are contemplated, which are within the scope of the appended claims. For example, although FIG. 1 depicts a lateral wellbore, the systems and techniques that are disclosed herein may likewise be applied to vertical well segments. The well may be an injection well in further example implementations. Additionally, the techniques and systems that are disclosed herein may likewise be applied to both land-based wells and subsea wells, depending on the particular implementation.

As a more specific example, using equipment of an Earth (E) surface-disposed flow delivery system 100, a combined gravel packing and fracturing operation (also called a "frac-pack operation" herein) may, in general, proceed as follows. In this operation, one or more surface-disposed pumps 119 communicate a flow into a central passageway of the tubing string 130 so that the flow is communicated downhole through the central passageway to a crossover tool 162 of the string 130. As depicted in FIG. 1, the crossover tool 162 is generally disposed at the uphole end of the stage 135. The communicated flow exits the tubing string 130 at the crossover tool 162 and enters the annulus 134.

In the annulus 134, the fluid that leaves the tubing string 130 during the frac-pack operation may flow along two different paths. Along a first path, the fluid may be communicated into fractures of a fracture network that is formed in the near-wellbore formation region due to the pressurization of fluid by the surface pump 119. Along a second path, the fluid may return to the central passageway of the tubing string 130 through the screen assembly 140; and solid particles that have sizes larger than the openings, or slits, of the screen assembly 140 are filtered out by the screen assembly 140 and thus, remain outside of the screen assembly 140 in the annulus 134.

As also depicted in FIG. 1, the well 100 may include a wash pipe 164, which is disposed inside the tubing string 130 and which communicates the fluid that returns through the screen assembly 140 back to the crossover tool 162, where the fluid returns to the annulus between the tubing string 130 and the wellbore wall for its return to the Earth surface E.

Thus, FIG. 1 depicts an example system to introduce a fiber-containing flow into a well. This flow may be used for many different purposes, such as one or more of the following: preventing proppant settling; creating a more uniform proppant distribution; and selectively diverting fluid, as examples. Fibers may be used in a well, in accordance with further example implementations, for a number of different purposes, which may not involve proppant, gravel packing or hydraulic fracturing. For example, fibers may be introduced into a cement flow for purposes of increasing the rigidity of the cement and distributing stresses in the cement. Moreover, fibers may be used in other downhole applications, as can be appreciated by the skilled artisan. Thus, many variations are contemplated, which are within the scope of the appended claims.

For the specific example of FIG. 1, the system 100 includes a blender assembly 114, which mixes, or blends, various materials/fluids together for purposes of forming a corresponding flow that is communicated into the well 102. In this manner, the blender assembly 114 may receive, as examples, a fluid 106, proppant 108 and fibers 110, which the blender assembly 114 combines into a flow, which is routed to an output line 105, routed through control valves 118 and which may be pressurized by the pump(s) 119 before being delivered to the tubing string 130.

A particular challenge in delivering the fibers 110 to the blender assembly 114 is that the fibers 110 are delivered to the well site in their bulk form, and the fibers 110 are introduced in a metered fashion into the flow that is delivered downhole. Here, "bulk form" refers to the state of the fiber material, as delivered to the well site (after being removed from any packages or packing material). In bulk form, the fibers 110 may have a relatively low bulk density, such as a density on the order two to four pounds per cubic foot. The relatively low bulk density of the fibers 110 may be attributable to such factors as a relatively low specific gravity of the bulk fiber material (a specific gravity being near or within the range of 1.0 to 2.7, for example) and the packing density of the bulk fiber material. As examples, for fiberglass-based fibers, the fibers may have a specific gravity near or at 2.65; for nylon-based fibers, the specific gravity may be near or at 1.0; and for acrylic-based and polylactic acid-based fibers, the specific gravities may be near or within the range of 1.2 to 1.3.

The specific gravity may be significantly lower than 1.0, in accordance with further example implementations. For example, in accordance with some implementations, the introduced solids may contain one or more of the following: polybutylene (having a specific gravity of 0.92); polyethylene (having a specific gravity of 0.92 to 0.97); ultra low density polyethylene (having a specific gravity of 0.90); T/P elastomer (urethane) (having a specific gravity of 0.83); and polypropylene (having a specific gravity of 0.95). Moreover, the introduced solids may include plastics that can be "foamed" to form closed cell air pockets to form an even lighter material, such as polymeric foam; styrofoam (having a specific gravity of 0.1); and polyvinyl chloride foam (having a specific gravity of 0.6 to 0.8).

It is noted that different fiber materials may have significantly different bulk densities, even though the fibers have relatively similar actual, or absolute, densities. For example, an acrylic fiber-based material may have a bulk density of 2 to 4 lb/ft$^3$ (or 0.032 to 0.064 g/cm$^3$), with the absolute density of the acrylic fiber being about 1.17 g/cm$^3$. A polylactic acid (PLA) fiber may have relatively similar absolute density of about 1.25 g/cm$^3$. However, a PLA fiber-based material may have a relatively higher bulk density of about 10 lb/ft$^3$ (0.16 g/cm$^3$).

With a relatively low bulk density of the bulk fiber material, it may be quite challenging to introduce the fibers 110 directly into the blender assembly 114 at a sufficient volumetric rate (a rate at, or near or greater than about or equal to one cubic foot per minute, as an example) to satisfy the desired fiber concentration in the flow that is communicated into the well 102.

Moreover, as will become apparent from the following description, feeding fibers into a blender assembly by introducing the bulk fiber material directly into the blending assembly's hopper may be relatively challenging when the material has a relatively low bulk density; and it may also be relatively challenging to meter the fiber feed rate using this direct delivery approach.

In accordance with techniques and systems that are disclosed herein, a blower assembly 112, which is remotely disposed with respect to the blender assembly 114, is used to generate a fiber-containing pneumatic flow to deliver fibers to the blender assembly 114; and the blower assembly 112 is constructed to enhance the metering of the volumetric rate at which the fibers are delivered to the blender assembly 114. More specifically, in accordance with example implementations, the blower assembly 112 produces a forced pneumatic flow; and the blower assembly 112 is constructed to receive the fibers 110 in bulk form and introduce the fibers 110 into the forced pneumatic flow to produce a fiber-containing pneumatic flow that is routed to a hopper of the blender assembly 114.

The blower assembly 112 furnishes the fiber-containing pneumatic stream to a conduit 104 that extends to a fiber-receiving hopper (a "cone-shaped" hopper, for example implementations that are described herein) of the blender assembly 114. As an example, the conduit 104 may be a flexible pipe, such as a wire-reinforced plastic flexible pipe. In further example implementations, the conduit 104 may be a rigid pipe or may be formed from a combination of rigid and flexible sections.

Due to the use of a pneumatic stream to communicate the fibers, the blower assembly 112 may be remotely disposed with respect to the blender assembly 114 (disposed at a distance of ten or more feet (3 or more meters) from the blender assembly 114, as an example). This spatial isolation between the fiber introduction point and the blender assembly 114 may provide certain advantages pertaining to avoiding environmental hazards, facilitating fiber material handling and generally enhancing the process of introducing fibers into a downhole flow, as further described herein.

As examples, the fibers may be single component fibers, such as polylactide acid fibers; fiberglass fibers; acrylic fibers; nylon fibers; or phenolic formaldehyde fibers, as just a few examples. Moreover, in accordance with further example implementations, the fiber 110 may be a multilayer, or multicomponent, fiber, which includes a core material (a nylon core, for example), which is enclosed by a sheath (a polymer sheath, for example) and may be coated with a finishing agent to prevent the fiber from sticking. Other fiber compositions may be used, in accordance with further example implementations.

Figure 2A:
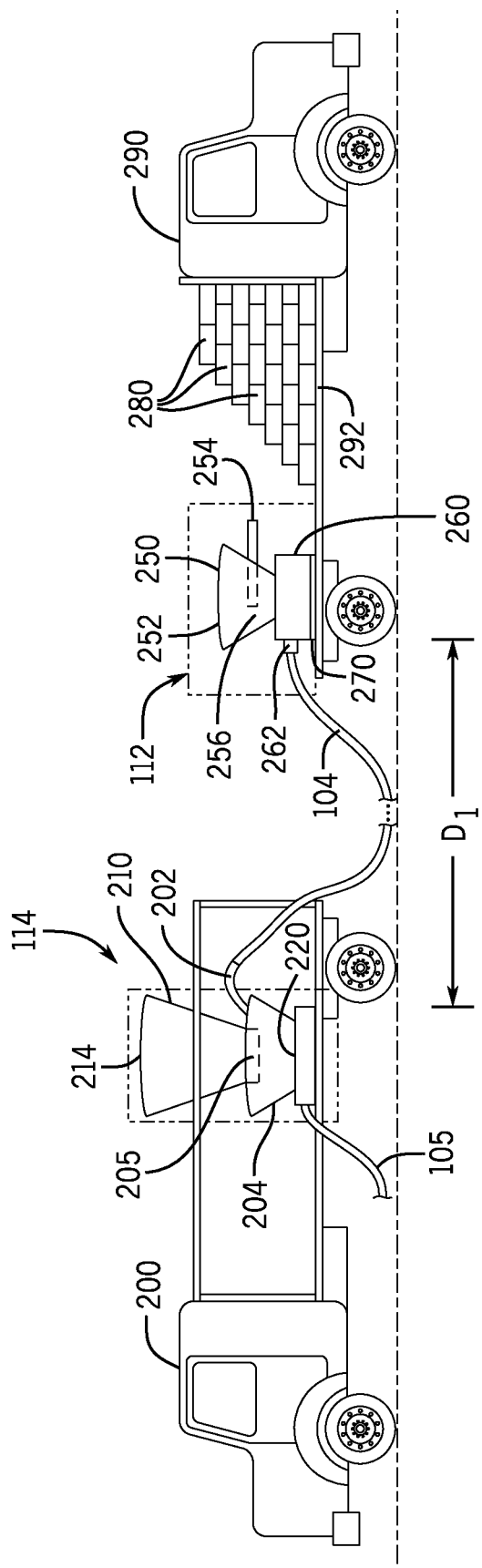
FIG. 2A is a more detailed side view of a blender assembly and a blower assembly of FIG. 1 according to an example implementation.

Referring to FIG. 2A, in accordance with example implementations, the blower 112 and blender 114 assemblies may be disclosed by a distance $D_1$, which may be in a range from ten to fifty feet, depending on the particular implementation. The blower assembly 112 may include a hopper 250 that has an upper opening 252 to receive the bulk fiber material for introduction of the fibers into a forced pneumatic flow to produce the forced, fiber-containing pneumatic stream that is furnished to the blender assembly 114. As depicted in FIG. 2A, in accordance with example implementations, the blower assembly 112 may be mounted on a bed 292 of a truck 290, which may also serve to transport/temporarily store of the bulk fiber material. In this manner, as shown in FIG. 2A, the bulk fiber material may be arranged in bales or bags 280 (30 to 50 pound packages, for example). In this manner, a worker may open the bags 280 as needed to introduce the bulk fiber material into the hopper 250.

The fiber material that is introduced into the hopper 250 enters a forced pneumatic stream that is generated a pneumatic blower 260 of the blower assembly 112 to produce the corresponding fiber-containing pneumatic stream that appears at an outlet 262 of the blower 260. The blower's outlet has a connector (not shown) that is constructed to attach to one end of the conduit 104. As further described herein, the blower assembly 112 may further include equipment to separate the bulk fiber material and deliver the fiber material to the blower 260.

In accordance with example implementations, the blower assembly 112 may contain equipment to meter the introduction of the fiber material into the hopper 250. More specifically, in accordance with example implementations, the blower assembly 112 is positioned on a weight scale 270, which measures the weight of the fiber material in the hopper 250 and indicates the measured weight (via a display or electrical signaling, as examples). By monitoring the rate at which the fibers are introduced into the pneumatic stream (i.e., by the rate of weight decrease), a human operator (for example) may control the appropriate metering device to regulate the rate at which the bulk fiber material is introduced into the pneumatic stream.

As an example, as depicted in FIG. 2, in accordance with some implementations, a gate 254 may be partially disposed inside the hopper 250 and be accessible for control by a human operator (for example) to control the size of an opening 256 between a bottom of the hopper 250 and an opening to the blower 260. Thus, by regulating the opening 256 via translation of the gate 254 (e.g., manual or automated transition of the gate 254) based on the observed/measured weight, the rate at which the fibers are introduced into the pneumatic stream may be controlled. An automated system for performing the metering, in accordance with further example implementations, is discussed below.

Implementations other than the ones described above for handling the bulk fiber material may be used, in accordance with further implementations. For example, in accordance with some implementations, a mechanical lifting device, such as a crane or forklift, may be used for purposes of lifting the bulk fiber material into a position near or into the upper opening 252 of the hopper 250. As another example, in accordance with some implementations, a moving floor of the truck 290 (a conveyer belt on the bed 292, for example), may facilitate the handling of the fiber material and the introduction of the fiber material into the hopper 250. As other examples, a system to automatically deliver fiber into the hopper 250 may include such devices as an auger or push plate ram to automatically move the fiber out of a trailer and into a rotating air lock of the blower 260. Thus, many implementations are contemplated, which are within the scope of the appended claims.

In accordance with example implementations, the blower assembly 112 may be a fiber insulation blowing machine that is manufactured by such companies as Krendl Machine Company of Delphos, Ohio or Stantco Inc. of Dallas, Tex. Other fiber insulation blowing machines may be used and blower assemblies other than fiber insulation blowing machines may be used, in accordance with further implementations.

As depicted in FIG. 2A, in accordance with example implementations, the blender assembly 114 may also be mounted on a separate truck 200 and as a more specific example, may be a Precision Optimal Density (POD) blender assembly that is available from Schlumberger. In general, the blender assembly 114 includes at least one hopper 210 to receive a material other than fiber-based material. For example, an opening 214 of the hopper 210 may receive proppant (sand, for example), in accordance with example implementations. The blender assembly 114 may also receive a liquid (a carrier fluid, as examples), in accordance with example implementations. The hopper 210 delivers its material to a vortex-based mixer 220, in accordance with example implementations.

The blender assembly 114 also includes a hopper 204 to receive the fiber material that delivered via the pneumatic stream that is communicated by the conduit 104. In this regard, as depicted in FIG. 2A, in accordance with example implementations, an end of the conduit 104 may be attached to one end of a relatively rigid tubular chute 202 (a curved metal tube that generally follows the incline of the hopper 204 and is attached to the hopper 204, for example). The other end of the chute 202 opens into the hopper 204 to exhaust the fiber-containing pneumatic flow.

Figure 2B:
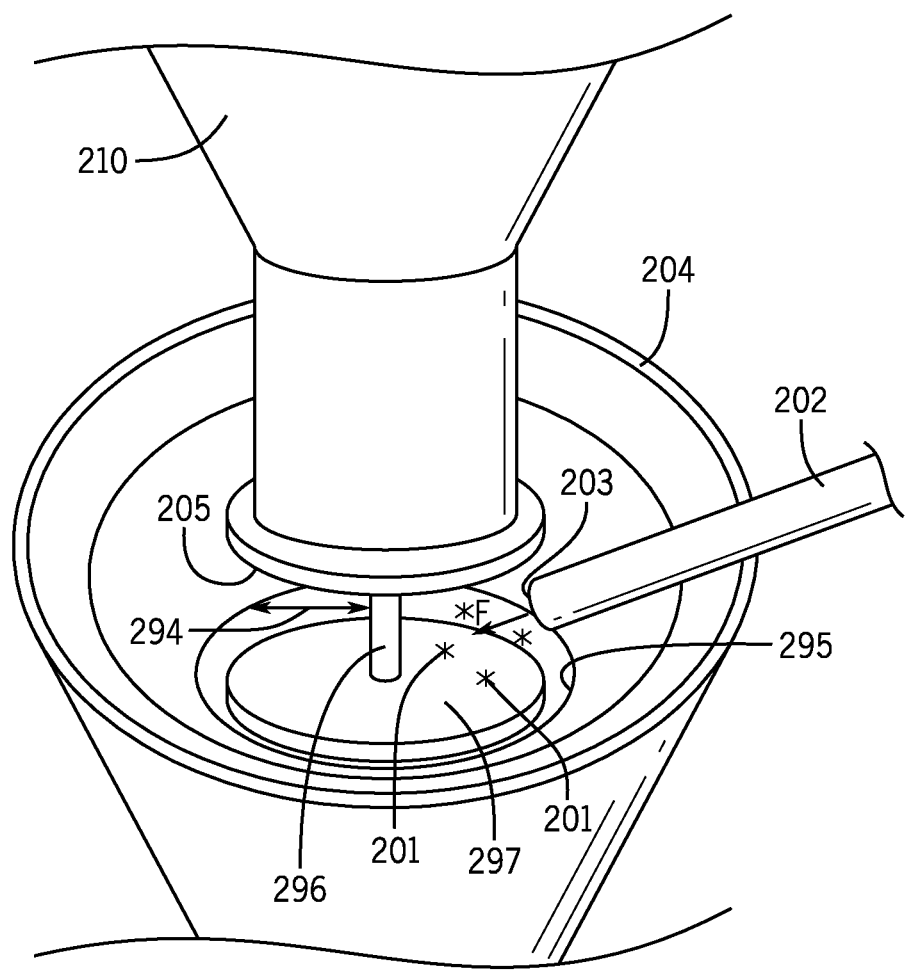
FIG. 2B is a perspective view illustrating a portion of the blender assembly that receives fibers via a pneumatic stream according to an example implementation.

More specifically, referring to FIG. 2B, in conjunction with FIG. 2A, in accordance with example implementations, the hopper 204 may be generally cone-shaped and may have a lower opening 295 that receives fibers 201 that exit an end 203 of the chute 202 in a flow F of fibers and air. In general, the hopper 204 receives the fibers 201, carrier fluid and the proppant from the upper hopper 210 such that these materials descend through the lower opening 295 of the hopper 204 to the mixer 220 (a shaft 296 and mixing blade 297 of the mixer 220 being shown in FIG. 2B). As depicted in FIG. 2B, an opening 294 between the edge of the lower hopper's opening 295 and the shaft 296 may be relatively small. This may introduce challenges for directly introducing relatively low density bulk fiber material into the hopper 204. However, these challenges are overcome or at least significantly mitigated due to the momentum associated with the pneumatic stream-based fiber delivery.

Figure 3:
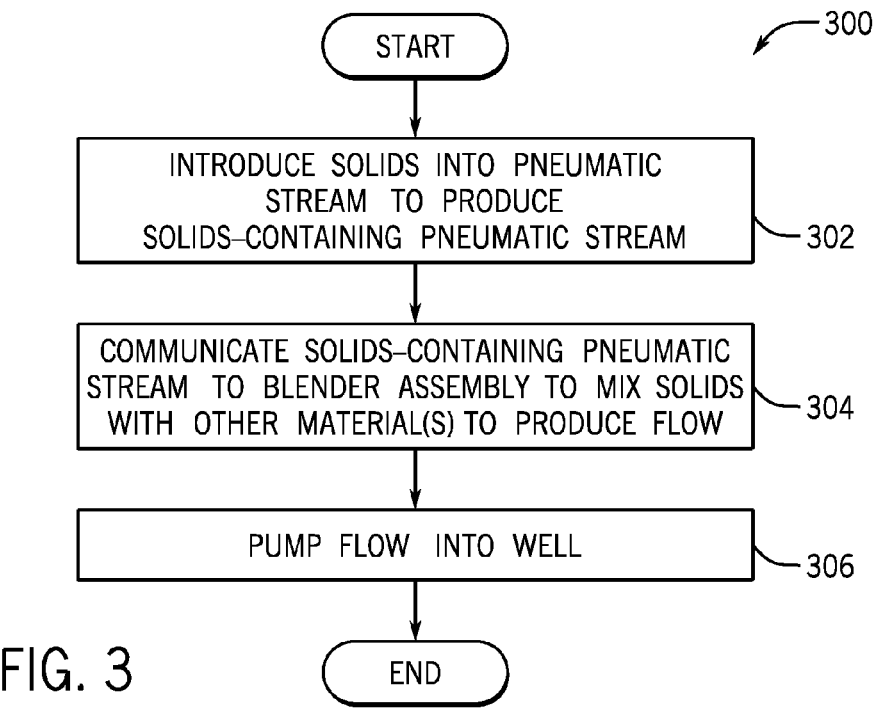
FIG. 3 is a flow diagram depicting a technique that uses a pneumatic stream to deliver solids to a blender assembly according to an example implementation.

Thus, in accordance with example implementations, a technique 300 that is depicted in FIG. 3 may be used for purposes of introducing solids (proppant, particulate material, a precursor material, a hydratable material, and the like, as examples) into a well flow. Pursuant to the technique 300, the solids are introduced (block 302) into a pneumatic stream to produce a solids-containing pneumatic stream, and this stream is communicated (block 304) to a blender assembly to mix the solids with at least one other material to produce a second flow, which is then pumped into the well, pursuant to block 306.

Figure 5:
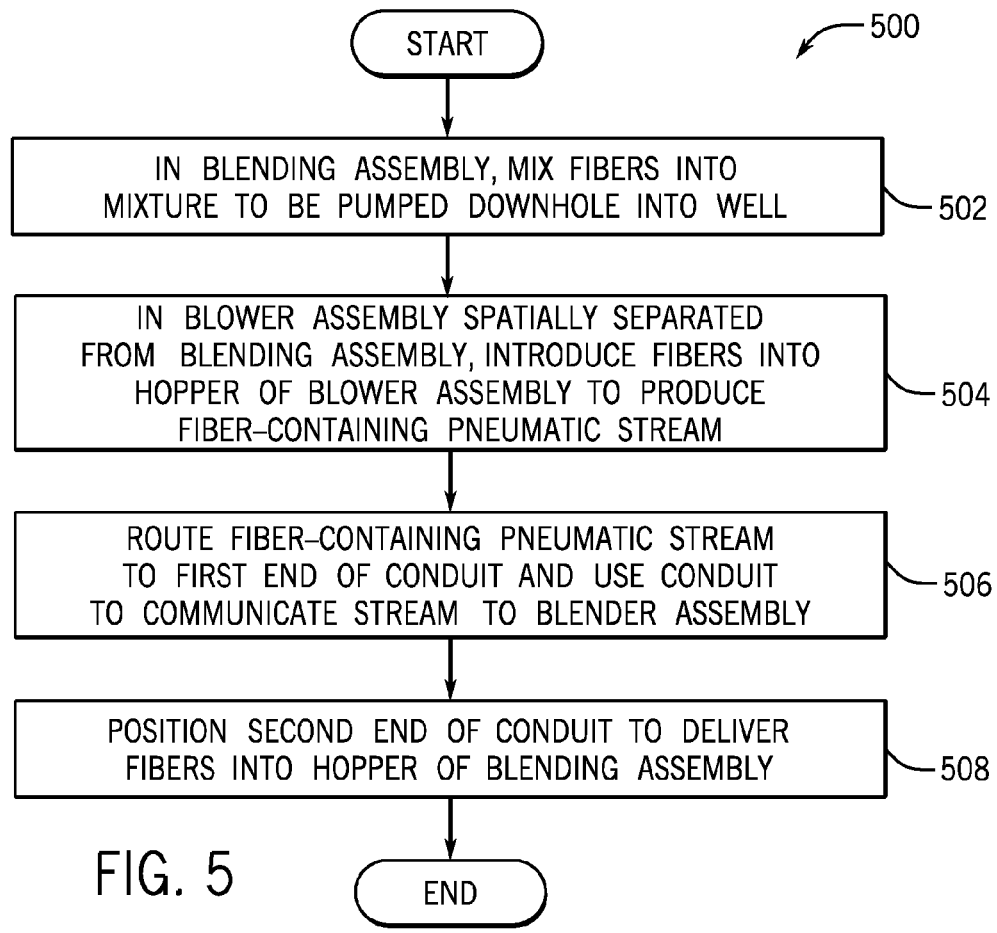
FIG. 5 is a flow diagram depicting a technique that uses a pneumatic stream to deliver fibers to a blender assembly according to an example implementation.

As a more specific example, a technique 500 that is depicted in FIG. 5 includes, in a blending assembly, mixing fibers into a mixture to be pumped downhole into a well, pursuant to block 502. In a blower assembly that is spatially separated from the blending equipment, fibers are introduced into a hopper of the blower assembly to produce a fiber-containing pneumatic stream, pursuant to block 504. The fiber-containing pneumatic stream is routed (block 506) to the first end of a conduit, and the second end of the conduit is positioned, pursuant to block 508, to deliver the flow of fibers into a hopper of the blending assembly.

Figure 4:
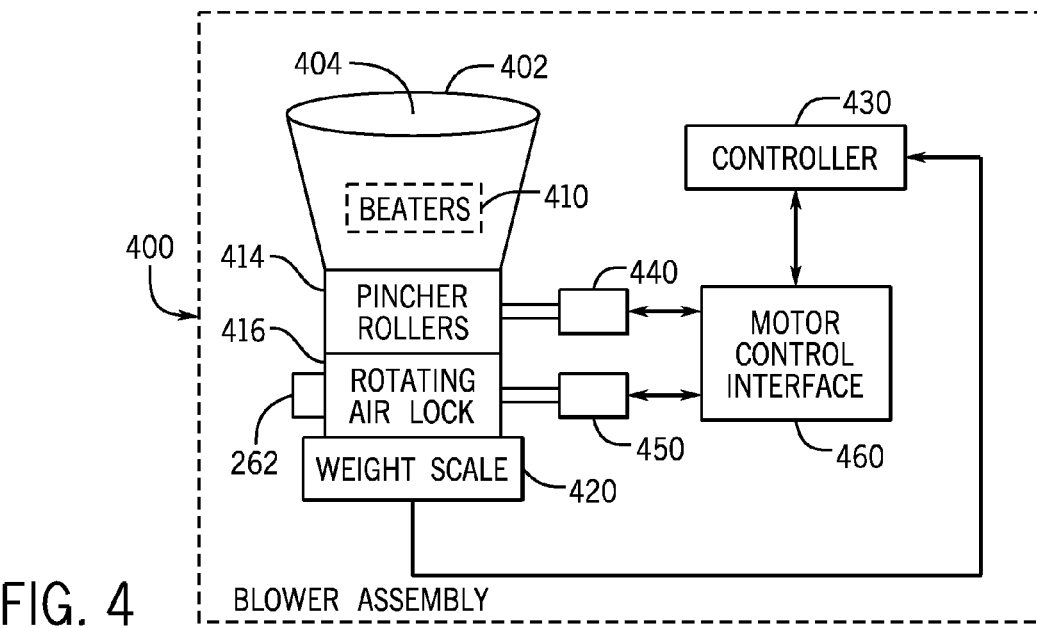
FIG. 4 is a schematic diagram of a blower assembly according to a further example implementation.

Referring to FIG. 4, in accordance with example implementations, the blower assembly may have a design similar to a blower assembly 400. The blower assembly 400 includes a hopper 402, which has an upper opening 404 to receive the bulk fiber material. Rotating beaters 410 that are disposed at the bottom of the hopper 402 separate the bulk fiber material, if needed, before allowing the separated material to descend upon pincher rollers 414 of the blower assembly 400. It is noted that in accordance with example implementations, the blower assembly 400 may further include a drive system, such as auger or screw-type drive mechanism (not shown), for purposes of feeding the fiber material into the pincher rollers 414. However, in accordance with further example implementations, a gravity-feed system may be employed.

After passing through the pincher rollers 414, the fiber material is introduced into a rotating airlock 416, which produces the forced pneumatic stream and introduces the fibers into the stream. In accordance with further example implementations, the blower assembly may include picker wheels or a hammer mill (as examples) to introduce the fiber into the rotating airlock 416. As depicted in FIG. 4, the outlet of the rotating airlock 416 forms the corresponding outlet 262 of the blower assembly 400, which may be connected to one end of the conduit 104 (see FIG. 2A).

FIG. 4 also depicts an automated loss-in-weight metering system for purposes of controlling the volumetric rate at which the fibers are introduced into the pneumatic stream, in accordance with example implementations. In this manner, in accordance with some implementations, a weight scale 420 is disposed (positioned to support the hopper 402, for example) to measure a weight of the fibers in the hopper 402 and provide an indication of the measured weight to a controller 430 (a CPU, microcontroller, a field programmable gate array (FGPA) and so forth). Based on the measured weight, the controller 430 controls a motor interface 460, which, in turn, controls the speeds of motors 440 and 450 that regulate the corresponding rotational speeds of the pincher rollers 414 and/or rotating air lock 416 to govern the rate at which the fibers are introduced into the pneumatic stream. It is noted that depending on the particular implementation, the blower assembly 400 may include a single motor (with a corresponding gear system to drive all rotating shafts) or may contain more than two motors. Thus, many implementations are contemplated, which are within the scope of the appended claims.

In general, the rate at which solids are delivered to the pneumatic stream may be based at least in part on loss in weight; a motion of conveying equipment; a position of a metering gate; a measurement of mixed solids fraction and a rate of the stream; or a measurement of a density of the pneumatic stream and an air flow rate. The loss in weight of the hopper may be measured and compensated to take into account periodic material addition. The measurement of the loss in product weight may also be performed by monitoring or measuring a moving belt that conveys the material to the hopper. For example, a time-based approach may be used where the belt speed is known. Measurement of the loss in weight may also be performed by measuring the rotation of feeding arms or screws that deliver the material to the hopper and using a suitable calibration curve. The loss in weight may be determined by measuring the position of a metering gate using a suitable calibration curve. In other example implementations, the density and rate measurement of the mixed fluid leaving the blender assembly may be monitored or measured to determine the loss in weight. The differential volumetric flow rate measurement of the base fluid entering the blender assembly and the mixed fluid leaving the blender may be used to determine the loss in weight. As another example, the loss in weight may be determined using a measurement of the pneumatic transfer conduit weight and air flow rate.

Figure 6:
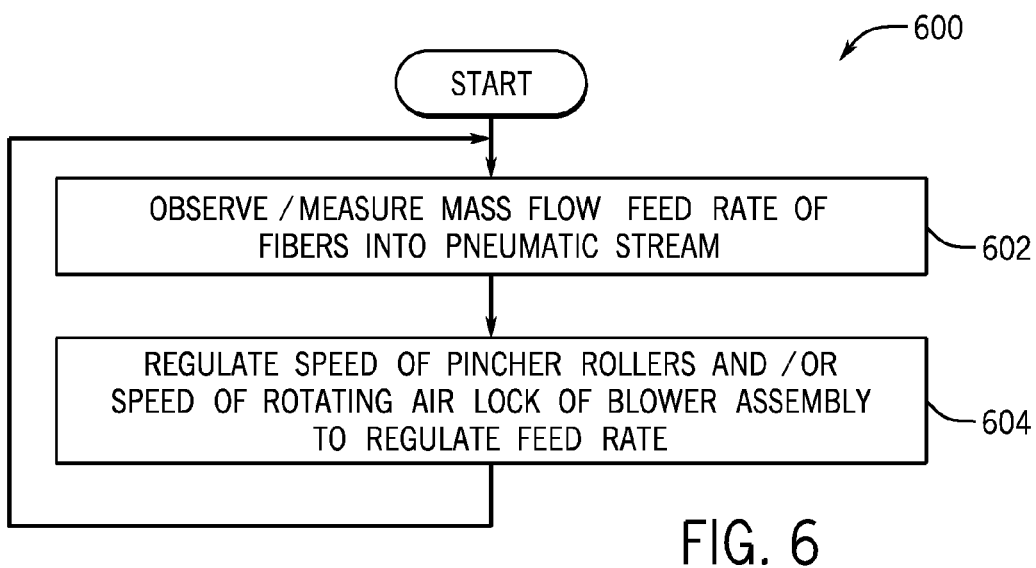
FIG. 6 is a flow diagram depicting a technique to meter a rate at which fibers are introduced to a pneumatic stream according to an example implementation.

Thus, pursuant to a technique 600 that is depicted in FIG. 6, the blower assembly's metering system observes (block 602) a mass flow feed rate of fibers into a pneumatic stream of fibers and regulates (block 604) the speed of pincher rollers and/or a speed of a rotating airlock of the blower assembly to regulate the fiber feed rate.

Among its potential advantages, the above-described fiber delivery and metering system avoid/mitigates potential environmental hazards. In this manner, the system allows spatial separation of the fiber introduction point from the blender assembly, an assembly that may be associated with relatively high pressure pipes (pipes communicating fluids having pressures that well exceed several thousand pounds per square inch (psi), for example). Moreover, the blender assembly may potentially expose a human operator (who may otherwise be directly emptying bags of fibers into the blending assembly's hopper) to corrosive agents (bases and acids, for example) as well as potential carcinogens and silica dust. Moreover, the isolation of the fiber introduction point from the blender assembly may isolate a human operator from oxidizers; flammable fluids; direct sunlight; harmful noises and vibrations; and may, in general, may isolate a human operator from moving machinery pinch points (a drive train of the blender assembly, for example).

Among other possible advantages of the techniques and systems that are disclosed herein, it is noted that the pneumatic stream-based delivery of the fibers creates a momentum for a relatively low bulk density fiber material, and this momentum may aid the delivery of the fibers into a relatively small opening between the shaft and cone of the blender assembly, as depicted in FIG. 2B. In this regard, as a comparison, merely depositing the bulk fiber material directly into the fiber hopper of the blender assembly may clog the blender assembly and cause the fiber material hopper to overflow. Moreover, by remotely disposing the fiber introduction point from the blender assembly, more access may be provided to the fiber hopper of the blower assembly for mechanical lifting aids to reduce manual lifting that may be required to introduce the bulk fiber into the blender assembly. Other and different advantages are contemplated in accordance with the many possible implementations, as can be appreciated by the skilled artisan.

Other implementations are contemplated, which are within the scope of the appended claims. For example, in accordance with some implementations, the system for delivering the solids-containing pneumatic stream may include collection system to collect solids that escape the blender assembly in the air that escapes the pneumatic stream. As examples, the collection system may use one or more of a filter, a cyclone separator, a precipitator and a water mister. As an example, a dust collection system may include a dust filter for purposes of filtering out air born dust particulates that are arise from the solids and may potentially be harmful to human operators. As a further example, the dust collection system may include a dust separation canister that is disposed near or at the blender assembly so that canister receives the solids-containing pneumatic flow from the conduit 104. The larger solids fall to the bottom of the canister and enter the hopper of the blender assembly, and the lighter dust particulates are drawn into the dust filter. Other collection systems may be used, in accordance with further example implementations.

In accordance with example implementations, the solids recovered by the collection system may be reintroduced into the blender assembly either immediately, in pulses, or in subsequent operations.

Although many of the implementations that are disclosed herein discuss the use of a pneumatic stream to deliver a single material, such as fibers, to the blender assembly, the pneumatic stream may be used in accordance with other implementations to deliver combinations of solids, such as fibers and proppants. Additionally, one may envisage to deliver a combination of dried solids to be mixed with, for example water, in order to form a slurry just before introduction in the wellbore. Such a combination of solids may for example comprise fibers, proppants, viscosifiers, loss control agents, friction reducers, clay stabilizers, biocides, crosslinkers, breakers, breaker aids, corrosion inhibitors, and/or proppant flowback control additives, or the like.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method usable with a well, comprising:
introducing solids into a hopper of an air blower assembly, thereby producing a solids-containing pneumatic stream at a first location near or at the blower assembly;
communicating the solids-containing pneumatic stream via a conduit from the first location directly to a second location at a hopper of a blender assembly at the second location to mix the solids with at least one other material, thereby producing a flow; and
pumping the flow into the well.

2. The method of claim 1, wherein:
the solids comprise fibers.

3. The method of claim 2, wherein the first and second locations are separated by at least ten feet.

4. The method of claim 1, wherein communicating the solids-containing pneumatic stream comprises communicating fibers, communicating proppant, communicating a precursor material or communicating a hydratable material.

5. The method of claim 1, wherein communicating the solids-containing pneumatic stream comprises communicating fibers to the blender assembly to mix the fibers with a proppant.

6. The method of claim 1, wherein communicating the solids-containing pneumatic stream comprises communicating fibers to the blender assembly to mix the fibers with a carrier fluid.

7. The method of claim 1, wherein communicating the solids-containing pneumatic stream comprises communicating fibers to the blender assembly to mix the fibers with a cement slurry.

8. The method of claim 1, wherein pumping the flow into the well comprises pumping the flow in connection with a hydraulic fracturing operation.

9. The method of claim 1, further comprising:
controlling a rate at which the solids are delivered into the pneumatic stream based at least in part on a loss in weight; a motion of conveying equipment; a position of a metering gate; a measurement of mixed solids fraction and a rate of the stream; or a measurement of a density and an air flow rate of the pneumatic stream.

10. The method of claim 1, further comprising:
collecting solids escaping the blender assembly carried by air escaping from the solids-containing pneumatic stream.

11. The method of claim 10, further comprising:
reintroducing the collected solids into the blender assembly.

12. A system usable with a well, comprising:
a blower assembly for receiving fibers and generating a pneumatic stream comprising the fibers;
a blender assembly for mixing the fibers with at least one additional material, thereby generating a flow; and
a conduit for communicating the pneumatic stream to the blender assembly, wherein the conduit comprises a first end for receiving the pneumatic stream from the blower assembly and a second end for providing the pneumatic stream directly to a hopper of the blender assembly; and
a pump for pumping the flow into the well.

13. The system of claim 12, wherein:
the blender comprises a hopper;
the conduit comprises a first end coupled to receive the pneumatic stream from the blower assembly; and
the conduit comprises a second end to provide the pneumatic stream to the hopper.

14. The system of claim 12, wherein the blender assembly comprises another hopper for receiving the at least one additional material.

15. The system of claim 12, wherein the conduit has a length of at least ten feet.

16. The system of claim 12, wherein the fibers are selected from the group consisting essentially of polylactide acid fibers; acrylic fibers; nylon fibers; fiberglass fibers; phenolic formaldehyde fibers; multicomponent fibers; and natural fibers.

17. The system of claim 12, wherein a flow rate of the fibers in the pneumatic stream comprises a volumetric rate near or exceeding one cubic foot per minute.

18. The system of claim 12, further comprising:
a first vehicle, wherein the blower assembly mounted to the first vehicle; and
a second vehicle, wherein the blender assembly mounted to the second vehicle.

19. The system of claim 18, wherein the first vehicle is adapted to transport the fibers to a well site in a first section of the first vehicle, the blower is disposed in a second section of the vehicle, and the first vehicle comprises a movable surface to move the fibers from the first section of the first vehicle to the second section of the first vehicle.

20. A method usable with a well, comprising:
in blending equipment, mixing fibers into a mixture to be communicated downhole in the well, the blending equipment comprising a fiber hopper to receive the fibers and a second hopper to receive another material of the mixture;
in pneumatic blowing equipment separated from the blending equipment, introducing the fibers into a material hopper of the pneumatic blowing equipment to produce a forced stream of the fibers;
routing the forced stream of fibers from the blowing equipment to the blending equipment using a conduit having a length of at least ten feet; and
positioning an end of the conduit to deliver the forced stream directly into the fiber hopper of the blending equipment; and
pumping the mixture into the well.

21. The method of claim 20, wherein mixing the fibers comprises mixing the fibers with one of a hydraulic fracturing fluid and a cement slurry.

22. The method of claim 20, wherein introducing the fibers comprises regulating a mass flow rate of the fibers into the material hopper of the pneumatic blowing equipment based on a monitored time rate at which the fibers are being delivered to the forced stream.

23. The method of claim 22, wherein regulating the mass flow rate comprises, based on the monitored time rate, regulating a speed of a beater, a speed of a rotating air lock of the pneumatic blowing equipment, or a combination thereof.

* * * * *